United States Patent [19]
Hirt

[11] Patent Number: 5,848,801
[45] Date of Patent: Dec. 15, 1998

[54] APPARATUS FOR FASTENING A GAS BAG

[75] Inventor: Dieter Hirt, Heuchlingen, Germany

[73] Assignee: TRW Occupant Restraint Systems GmbH, Alfdorf, Germany

[21] Appl. No.: 812,631

[22] Filed: Mar. 7, 1997

[30] Foreign Application Priority Data

Mar. 15, 1996 [DE] Germany ............... 296 04 875 U

[51] Int. Cl.⁶ ................ B60R 21/16; F16B 19/06
[52] U.S. Cl. .................. 280/731; 280/728.2; 411/504
[58] Field of Search ............ 411/501, 504, 411/505; 280/731, 728.2, 728.1

[56] References Cited

U.S. PATENT DOCUMENTS

| | | | |
|---|---|---|---|
| 1,093,835 | 4/1914 | Crump ............... | 411/504 |
| 2,160,374 | 5/1939 | Veillete ............. | 411/501 |
| 5,176,400 | 1/1993 | McGuire et al. . | |
| 5,427,407 | 6/1995 | Yokote . | |

FOREIGN PATENT DOCUMENTS

| | | |
|---|---|---|
| 0484527 | 5/1992 | European Pat. Off. . |
| 0485602 | 5/1992 | European Pat. Off. . |
| 4434301 | 3/1995 | Germany . |
| 3211520 | 6/1963 | Japan . |
| 3718911 | 7/1968 | Japan . |
| 45-17107 | 6/1970 | Japan . |
| 49-40213 | 11/1974 | Japan . |
| 54-937 | 6/1979 | Japan . |
| 57-198224 | 12/1982 | Japan . |
| 7291074 | 11/1995 | Japan . |
| 678200 | 8/1979 | Russian Federation ............... 411/504 |

*Primary Examiner*—Flemming Saether
*Attorney, Agent, or Firm*—Tarolli, Sundheim, Covell, Tummino & Szabo

[57] ABSTRACT

A means for fastening a first part of a gas bag module of a vehicle occupant restraint system to a second part of the gas bag module is provided. The first part is provided with a holding opening, and the second part is provided with an insertion opening whose diameter substantially corresponding to the diameter of the holding opening. The means comprises a metallic fastening sleeve which extends through the holding opening and the insertion opening and has a first axial end associated with the first part, a second axial end associated with the second part, and a longitudinal axis. The first axial end of the fastening sleeve comprising an abutment head, and the second axial end is crimped together perpendicularly to the longitudinal axis of the fastening sleeve so that by plastic material deformation two abutment surfaces are formed at least approximately diametrically opposed to each other such that the first and the second parts are secured in a direction parallel to the longitudinal axis between the abutment surfaces and the abutment head.

3 Claims, 2 Drawing Sheets

APPARATUS FOR FASTENING A GAS BAG

TECHNICAL FIELD

The invention relates a gas bag module of a vehicle occupant restraint system and in particular to an arrangement for fastening a first part of the gas bag module to a second part of the gas bag module.

BACKGROUND OF THE INVENTION

For such a fastening a stud bolt is often used which is received by a holding opening in the first part, extends through an insertion opening in the second part and on the thread of which a nut is screwed which is provided with a locking means. The drawbacks of this configuration are the relatively high costs for the stud bolt and the associated nut as well as the work involved in screwing on and locking the nut. When, in addition, a liquid synthetic resin is employed as the locking means for the nut, problems result during hardening of the synthetic resin if it gains access to locations other than that of the intended application.

For such a fastening a rivet may also be used. The drawbacks in this case, however, are the high material costs, depending on the circumstances, and the work involved in heading the rivet.

BRIEF SUMMARY OF THE INVENTION

The invention is to provide a fastening of a part provided with an opening to another part also provided with an opening, which as regards the material and work expense is more favorable than that of conventional means of fastening.

The invention provides a means for fastening a first part of a gas bag module of a vehicle occupant restraint system to a second part of the gas bag module. The first part is provided with a holding opening, and the second part is provided with an insertion opening whose diameter substantially corresponding to the diameter of the holding opening. The means comprises a metallic fastening sleeve which extends through the holding opening and the insertion opening and has a first axial end associated with the first part, a second axial end associated with the second part, and a longitudinal axis. The first axial end of the fastening sleeve comprising an abutment head, and the second axial end is crimped together perpendicularly to the longitudinal axis of the fastening sleeve so that by plastic material deformation two abutment surfaces are formed at least approximately diametrically opposed to each other such that the first and the second parts are secured in a direction parallel to the longitudinal axis between the abutment surfaces and the abutment head.

This fastening is distinguished by particularly low costs. For one thing, the expense of manufacturing the fastening sleeve is substantially less than that of a bolt and its associated nut, since the fastening sleeve may be manufactured from a conventional metal tube, and for another, the effort involved in producing the actual fastening of the two parts to each other is particularly low, since crimping one end of a fastening sleeve is easier to achieve than screwing on and locking a nut or forming the head of a rivet.

Advantageous embodiments of the invention are set forth in the sub-claims.

BRIEF DESCRIPTION OF THE DRAWINGS

The invention will now be described in the following with reference to a preferred embodiment which is illustrated in the attached drawing in which.

DETAILED DESCRIPTION OF THE PREFERRED EMBODIMENT

Figure 1:
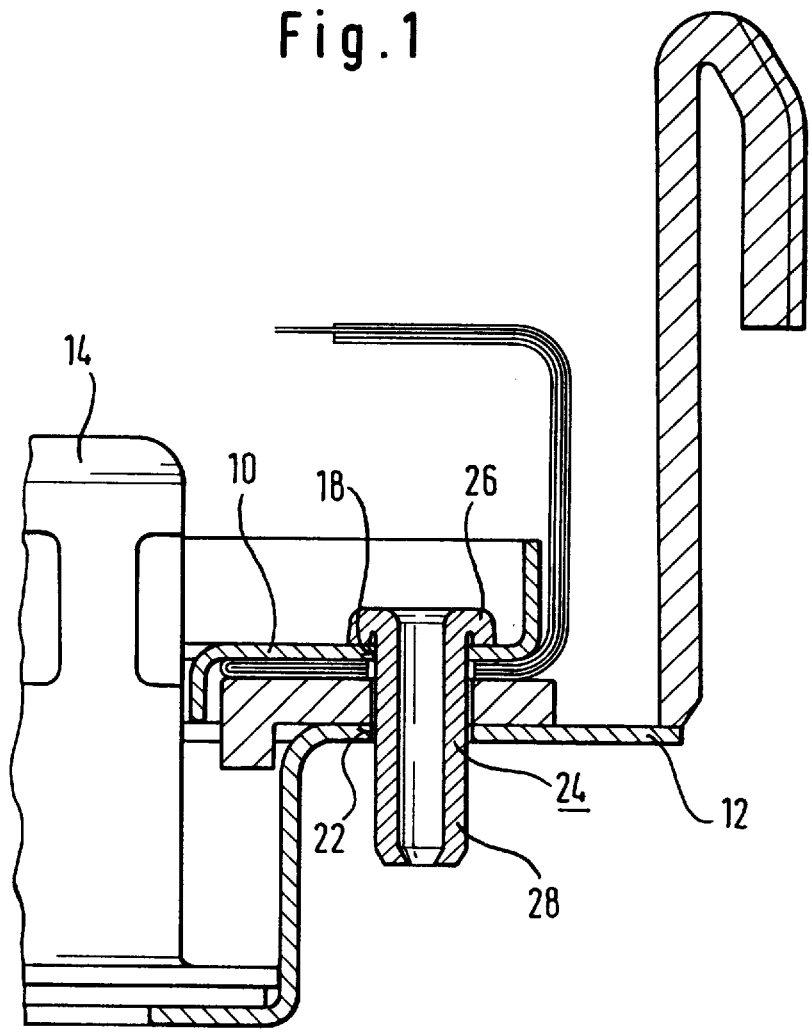
FIG. 1 is a sectioned partial view of a fastening according to the invention shown prior to the step of crimping the fastening sleeve.
Figure 2:
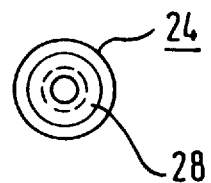
FIG. 2 is a plan view of the fastening sleeve of FIG. 1.
Figure 3:
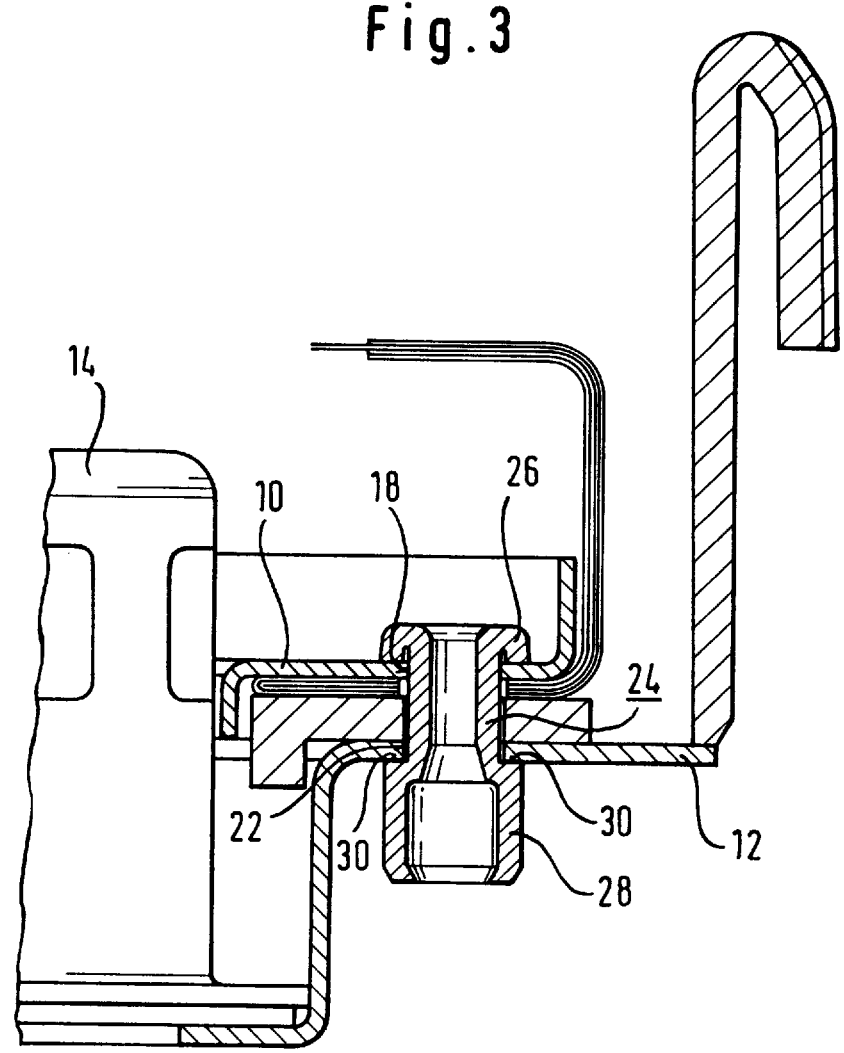
FIG. 3 is a view corresponding to that of FIG. 1 shown after the step of crimping the fastening sleeve.
Figure 4:
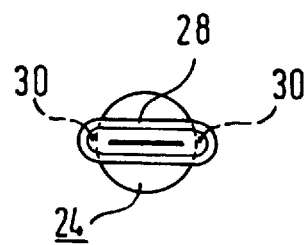
FIG. 4 is a plan view of the fastening sleeve of FIG. 3.

In the FIGS. 1 to 4 a preferred embodiment of a fastening according to the invention is illustrated, FIGS. 1 and 2 showing an intermediate stage in installation and FIG. 3 and 4 the final condition of the formed fastening.

FIGS. 1 and 2 show a first part 10 intended to be fastened to a second part 12. In the embodiment shown the first part 10 is a mounting flange of a gas generator 14 (shown in part) of a vehicle gas bag restraint system, and the second part 12 is a plate for fastening the gas generator 14. The first part 10 is provided with a holding opening 18, and the second part 12 is provided with a insertion opening 22, the diameter of which is slightly larger than the diameter of the holding opening 18. Through these two openings a fastening sleeve 24 extends which is made of metal and in the embodiment illustrated has a circular cross-section. A first axial end of the fastening sleeve 24 assigned to the first part 10 is provided with an abutment head which in the embodiment illustrated is obtained by beading the axial end of the fastening sleeve 24. The diameter of the holding opening 18 is so dimensioned that the fastening sleeve 24 is seated in the holding opening with a press-fit. Accordingly, the fastening sleeve 24 is mounted in the first part 10 by simple means, this resulting in advantages during installation. The diameter of the insertion opening 22 is so dimensioned that a clearance fit for the fastening sleeve 24 is formed whereby the latter can easily be inserted in the insertion opening 22.

FIGS. 3 and 4 show the connection of the first part 10 to the second part 12 in the final condition. The difference to the intermediate stage of installation depicted in FIGS. 1 and 2 consists of the second axial end 28 of the fastening sleeve 24, which protrudes from the insertion opening 22 and is assigned to the second part 12, having been crimped in a direction perpendicular to the longitudinal axis of the fastening sleeve 24 so that two abutment surfaces 30 located at least approximately diametrically opposed to each other are formed by plastic material deformation. The two parts 10, 12 to be fastened to each other are thus maintained in the axial direction between the abutment head 26 and the two abutment surfaces 30.

Due to the fastening according to the invention several advantages are achieved. Since the fastening sleeve 24 can be manufactured from a conventional metal tube, particularly low material costs result for the fastening sleeve. Since, except for having to form the abutment head 26, no further steps in processing the fastening sleeve 24, such as cutting a thread, need to be implemented, particularly low manufacturing costs are achieved. Since crimping the axial end 28 of the fastening sleeve 24 is simpler to implement than screwing a nut on a stud bolt, reduced installation costs are achieved. By crimping the axial end 28 at a suitable distance from the second part 12 the abutment surfaces 30 may be configured so that a preloading effect is achievable between the latter and the abutment head 26.

In accordance with a further embodiment (not shown) of the fastening according to the invention it is provided for that the fastening sleeve 24 in the starting condition, as well as the holding opening 18 and the insertion opening 22 all have an oval cross-section. In this way contact surfaces 30 significantly larger than in the case of a circular steel tube are achievable. It may furthermore be provided for that also the abutment head 26 of the fastening sleeve 24 is formed by crimping an axial end of the fastening sleeve.

I claim:

1. An apparatus comprising:

a gas bag module comprising a gas generator having a mounting flange, a mounting plate for mounting said gas generator in said gas bag module, and a gas bag partially disposed between said mounting flange and said mounting plate, said mounting flange of said gas generator including a holding opening having a first diameter, said mounting plate including an insertion opening having a second diameter which is slightly larger than said first diameter, said gas bag having a clearance opening axially aligned with said holding opening and said insertion opening; and a fastening sleeve centered on a longitudinal axis and extending through said holding opening, said clearance opening, and said insertion opening, said fastening sleeve consisting of a metal tube having first and second axial ends connected by a main body portion and a longitudinal passage extending throughout said fastening sleeve between said axial ends, said main body portion having a diameter approximately equal to said first diameter of said holding opening such that said main body portion of said fastening sleeve is press-fit into said holding opening to initially hold said fastening sleeve in place in said mounting flange of said gas generator, said first axial end of said fastening sleeve being disposed inside said gas bag and comprising an abutment head abutting said mounting flange of said gas generator, said second axial end of said fastening sleeve being plastically deformed by crimping in a direction perpendicular to said longitudinal axis to form two approximately diametrically opposed crimp abutment surfaces abutting said mounting plate of said gas bag module, said mounting flange of said gas generator, said mounting plate, and said gas bag being secured between said abutment surfaces and said abutment head of said fastening sleeve in a direction parallel to said longitudinal axis with a longitudinally directed load resulting from the crimping of said second axial end of said fastening sleeve.

2. The apparatus of claim 1 wherein said abutment head is formed by a bead at said first axial end of said fastening sleeve.

3. The apparatus of claim 1 wherein said fastening sleeve has a circular cross-section prior to being crimped.

* * * * *